United States Patent [19]

Itzkowitz

[11] 4,362,980
[45] Dec. 7, 1982

[54] POSITION ERROR RECOVERY AND MOTOR CONTROL SYSTEM

[75] Inventor: Herman Itzkowitz, Bala Cynwyd, Pa.

[73] Assignee: Exxon Research and Engineering Co., Florham Park, N.J.

[21] Appl. No.: 183,964

[22] Filed: Sep. 3, 1980

[51] Int. Cl.³ .............................................. G05B 19/40
[52] U.S. Cl. .................................. 318/685; 318/561; 318/632
[58] Field of Search ...................... 318/685, 561, 632; 371/25, 57, 67

[56] References Cited

U.S. PATENT DOCUMENTS

| | | | |
|---|---|---|---|
| 3,370,289 | 2/1968 | Hedgcock et al. | 318/685 |
| 3,482,155 | 12/1969 | Fredriksen | 318/685 |
| 4,025,837 | 5/1977 | Meier et al. | 318/685 |
| 4,129,812 | 12/1978 | Hunts et al. | 318/685 |
| 4,173,752 | 11/1979 | Yamanaka | 371/57 |
| 4,187,455 | 2/1980 | Martin | 318/685 |

Primary Examiner—B. Dobeck

[57] ABSTRACT

A motor control system for driving a stepper motor and a typewriter or the like is provided, the control including reliable means for tracking incremental movements of the stepper and the element being driven by the stepper. Phase combinations of the stepper motor are energized as a function of tracked position, in a manner which optimizes movement from a present position to a target position. Present position is tracked by generating a pair of sensor signals and converting same to digital signals, which digital signals are constrained to change in accordance with the predetermined pattern on a step by step or increment by increment basis. If the pattern is not followed precisely the error is detected and a correction in position information can be made.

22 Claims, 10 Drawing Figures

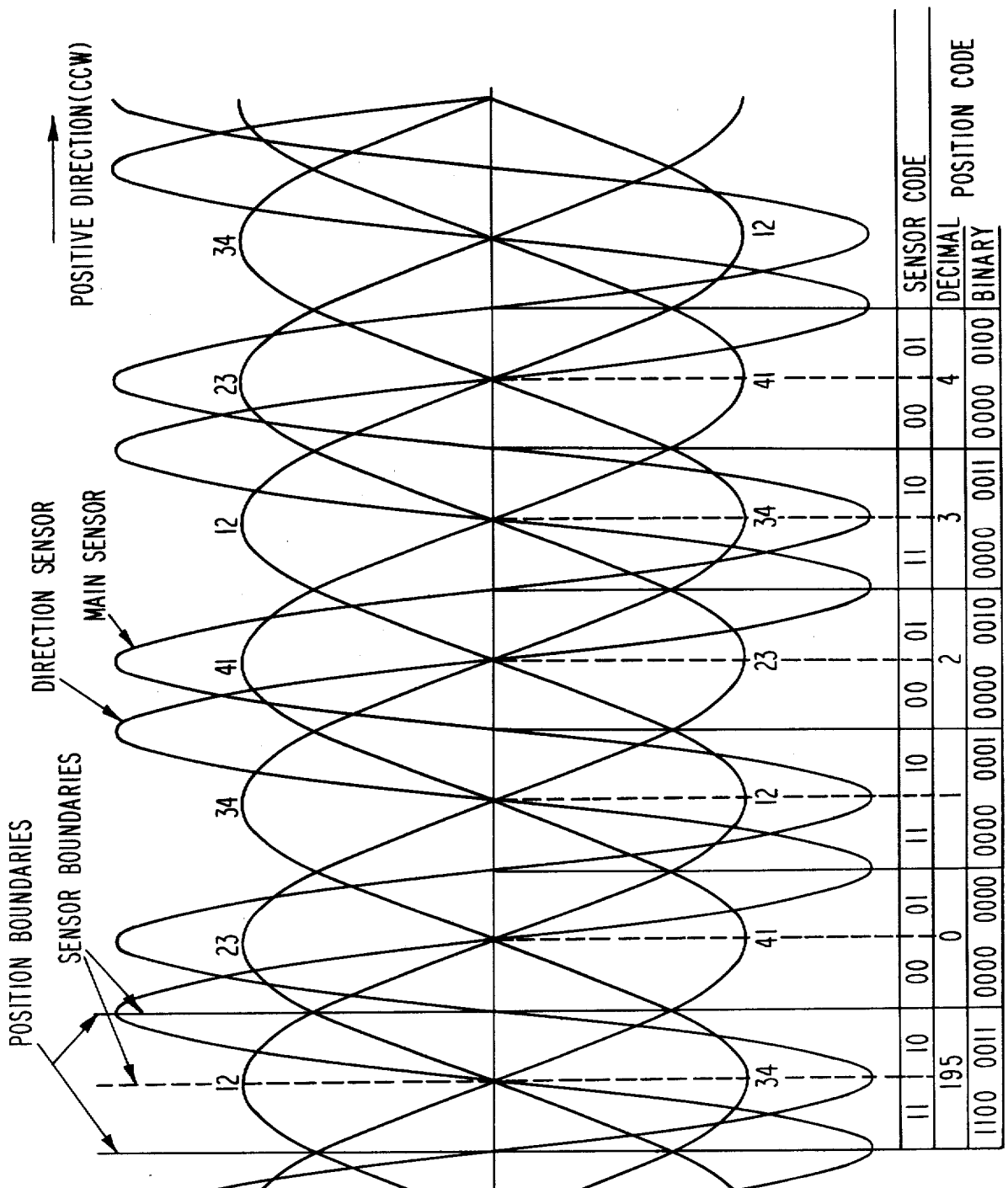

POSITION ERROR RECOVERY AND MOTOR CONTROL SYSTEM

BACKGROUND OF THE INVENTION

This invention lies in the field of motor control systems for stepper motors and more particularly, motor control systems adapted to drive stepper motors in typewriters and like printing instruments, control being based upon tracked position of the element being driven by the stepper motor.

In the field of electronic typewriters, and in particular the latest generation of intelligent typewriters, printing systems are provided which utilize highly automated control systems for providing high speed word processing capabilities. In such control systems, multiple phase stepper motors have been found to be highly efficient for transporting or rotating elements, i.e. a linear stepper motor for driving the carriage, and a rotary stepper motor for rotating the daisy wheel which is in turn carried on the linearly driven carriage. The construction of the motors is known in the art, and reference is made to an article titled MOTION CONTROL ASPECTS IN THE QYX INTELLIGENT TYPEWRITER, by G. Singh, M. Gerner and H. Itkowitz, presented at the 8th annual symposium on Incremental Motion Control Systems And Devices, Champagne, Ill., May 1979. This article is incorporated by reference and specifically referred to as background for typewriter systems, and in particular for the operation and construction of stepper motors.

In the prior art as described by the Singh et al article, motion monitoring is done for the limited purpose of detecting when the rotor has advanced to the point where the phase energization should be switched. Thus, in this prior art system the selection of the phase pair to be energized is done on a predetermined or programmed basis, and the position information is used only to initiate switching of the phase windings that are energized. In such a prior art system, there is in fact no actual tracking of the position of the rotor or of the element such as the daisy wheel which is being driven thereby, and thus the control system has no reliable way of knowing where in fact it is. Although prior art position counting systems as such are generally known in various fields, such systems suffer the detriment of not being able to detect when or if an error in position calculation has occurred, so as to be able to correct error position data.

There thus has remained a need in the art, and particularly in the typewriter art, for a control system which drives the moving element from a present position to a target position, the control system operating as a function of tracked position, wherein there is provided reliable means of obtaining position data and knowing when or if there is an error in position, so that proper position error recovery can be carried out.

SUMMARY OF THE INVENTION

It is an object of this invention to provide a motor control system for driving a movable element, with an improved position tracking means, the control system driving the movable element as a function of tracked element position.

It is another object of this invention to provide a motor control system utilizing a stepper motor, having reliable means of detecting movement of the motor on a position or a step basis, and of counting positions or steps as they are traversed by the element driven by the stepper motor;

It is yet another object of this invention to provide means for monitoring movement of an element driven by a stepper motor, with means for checking for any error that occurs in sensing position change.

It is another object of this invention to provide improved means of switching the energization phase combinations of a stepper motor, the switching being accomplished as a function of sensed motor position.

In view of the above objects, there is provided a stepper motor system with improved tracking means, the system having one or more stepper motors each driving an element coupled thereto, sensor means for generating a plural state signal representative of movement of the element, and means for determining when changes of said sensor signal are accurate and when they are in error. Preferably the plural state sensor signal is a two bit signal, and is generated such that for proper operation it changes only one bit at a time, with accompanying means for monitoring to determine if said two bit signal changes by more than one bit at a time, thereby providing for error detection.

BRIEF DESCRIPTION OF THE DRAWINGS

FIG. 2A comprises rotary sensor and phase curves.

DESCRIPTION OF THE PREFERRED EMBODIMENT

The following description relates to a motor drive system for use in a typewriter such as the QYX intelligent typewriter disclosed in the referenced publication by Singh et al. The referenced publication discloses in detail both a linear stepper motor such as is used for driving the typewriter carriage, and a rotary stepper motor such as used for rotating the daisy wheel printer to the proper position. Detailed descriptions of these motors are not presented in this specification since they are disclosed in the referenced publication and elsewhere in the patent literature. However, by way of background, a portion of a printer typewriter to which this invention is applicable includes a print wheel mounted on a carriage which is adapted to move in a direction parallel with the axis of a platen so as to position the print wheel at various positions along a print receiving medium. As the carriage is moved by a linear stepper motor under automatic control, the print wheel is rotated by a rotary stepper motor mounted on and carried by the carriage. Both stepper motors are suitably four phase motors, and are driven by energizing a combination of two phases at a time.

Figure 1A:
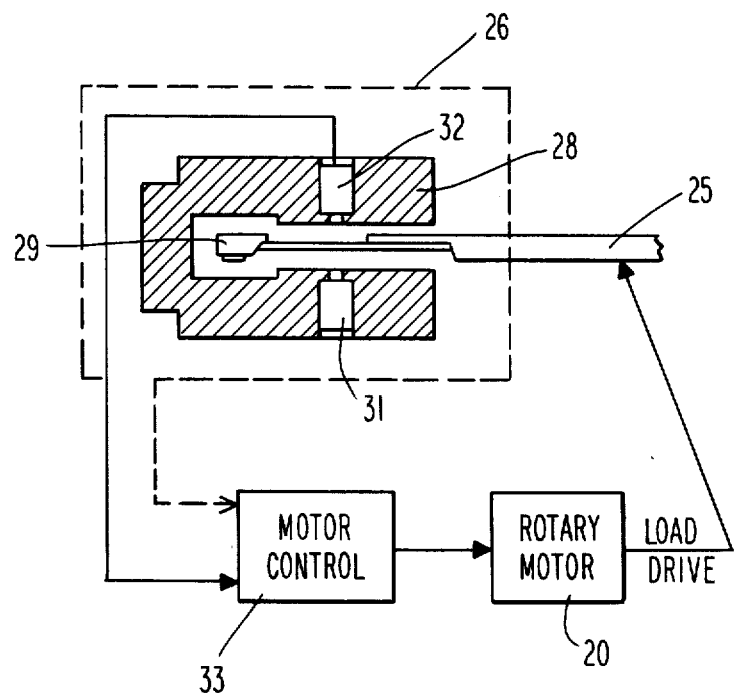
FIG. 1A is a schematic drawing showing a motor control for a rotary motor driving a daisy wheel, in combination with a sensor arrangement for providing position signals to the motor control.

Referring now to FIG. 1A, there is shown a schematic representation of the rotary motor drive, illustrating the manner of obtaining sensor signals representative of daisy wheel position. The daisy wheel has a plurality of spokes 25 extending therefrom, each with a character head 29 at the end thereof, there being 98 such spokes in the preferred embodiment. The spokes 25 are driven by rotary motor 20 so that they pass through sensor means 26 which generates main and direction sensor signals in a manner described herein below. Sensor means 26 comprises suitably a bracket 28 through which the end of the spokes 25 rotate, the spokes cutting a beam of light which is generated by light source 31 and directed at light detector 32. The width of the spokes, the shape of the detector, and the spacing therebetween is designed so that the signal generated at detector 32 is substantially a sine wave signal. Suitably positioned at another point on the sensor means is another light source-detector pair, not shown, which is spaced from the pair 31, 32 so as to provide a second signal which is 90 electrical degrees out of phase with the first signal. The two signals are inputted to the motor control, designated generally at block 33, which generates motor drive signals for driving the rotary motor.

Figure 1B:
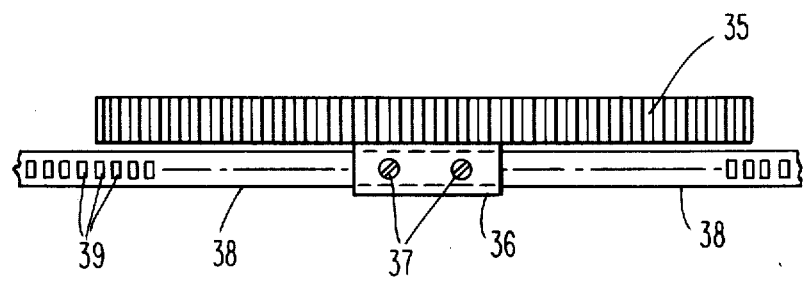
FIG. 1B is a schematic representation of a sensor means for sensing position signals for a linear motor system.

Referring to FIG. 1B, there is shown a schematic representation of the means for detecting sensor signals for a linear motor, so as to derive positional and direction information for such linear motor. The linear motor drives a slider element 35, which carries a bracket 36 on which are mounted spaced light detectors 37. A timing band 38 extends along the length of the motor, and comprises a plurality of openings 39 which are sensed by the optical sensing means. The optical sensing means comprises the detectors 37 which are exposed through the openings 39 to light sources (not shown) on the opposite side of the band 38. As in the case for the rotary embodiment, detectors 37 are spaced so that the signals derived therefrom are 90 electrical degrees apart from each other.

Referring now to FIG. 2A, there is seen a combined phase and sensor diagram for a rotary motor as used in the system of this invention. The four phase motor is energized by phase pairs, i.e. phases one and two (1, 2), phases two and three (2, 3), etc. Energizing any one of the four phase pairs provides a sinusoidal torque wave, as is well known. The sensor curves are illustrated for both the direction (D) sensor and main (M) sensor. Note that the main sensor crosses over the zero reference line at the position boundaries while the direction sensor signal is 90° out of phase from the main sensor signal. For the rotary motor, there are 98 sensor spokes, or pedals, and 196 positions. The positions are indicated at the bottom of FIG. 2A, and are numbered 0–195. Corresponding to each position there is an 8 bit binary code, and there are two different sensor codes for each position. A 2 bit sensor code change is generated for each sensor quadrant, i.e. each 90° of a sensor signal, corresponding to each time one or the other of the sensor signals crosses over 0, or the base line. There are thus two sensor quadrants for each position, and each sensor quadrant is identified by a 2 bit sensor signal. It is important to note that the sensor code, from quadrant to quadrant, does not change more than 1 bit at a time.

Figure 2B:
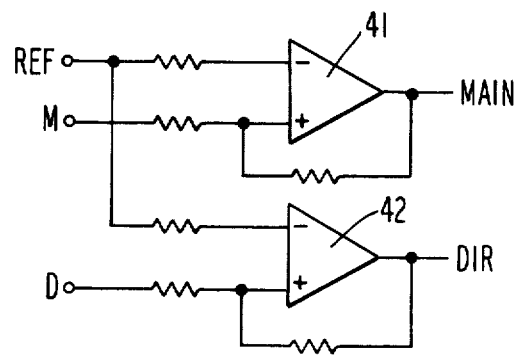
FIG. 2B is a schematic drawing of an analog to digital amplifier utilized with the rotary embodiment of this invention.

As seen in FIG. 2B, each of the sensor analog signals, main and direct, is inputted to a respective difference amplifier 41, 42, and compared with a reference signal to provide a plus or minus digital output. This digital sensor signal can be used and is used in this invention to track the position of the rotary motor. The sensor signal also carries directional information, i.e. from analyzing the progression of the 2 bit sensor code it can be determined whether the rotary motor is stepping in a clockwise or counter clockwise direction. Note that when there has been a counter clockwise (CCW) position change, old sensor 2 bit code always contains a single zero and a single one. Accordingly, if the old sensor code is put through an exclusive-or circuit, it outputs a one when the rotor is going in a counter clockwise direction. If the rotor is going in a clockwise (CW) direction, the old sensor is always both zeros or both ones, such that applying exclusive-or logic results in a zero. As will be seen in the discussion of the motor control in connection with FIG. 4, this information is used to determine whether to increment the present position register (for counter clockwise rotation) or decrement the present position register (for clockwise rotation).

Figure 3A:
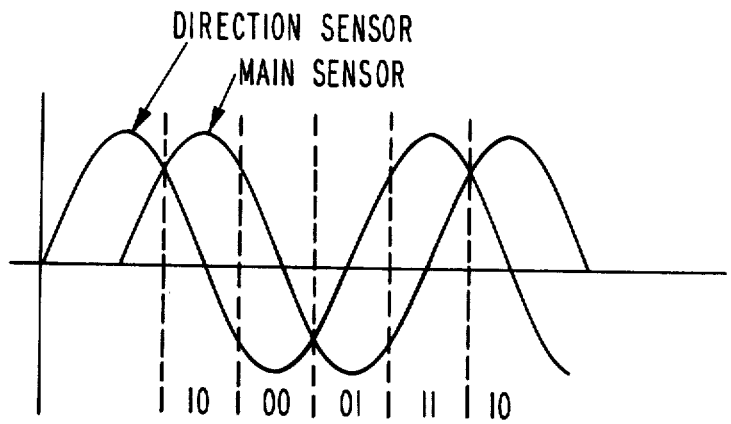
FIG. 3A comprises sensor curves for the linear motor system of this invention.
Figure 3B:
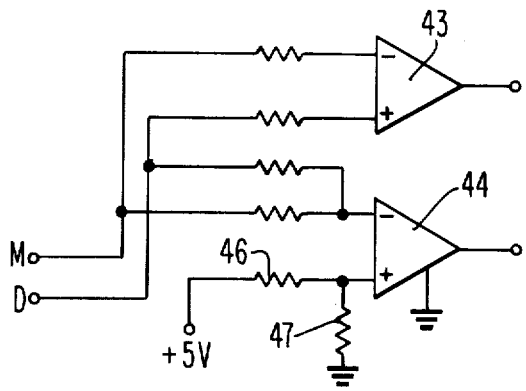
FIG. 3B is a schematic drawing of the analog to digital comparator amplifier utilized in the linear motor system of this invention.

Referring to FIG. 3A, there are shown the curves for the 2 sensors as used in connection with the linear stepper motor. For the linear embodiment, the position band contains 30 slits per inch, and a sensor quadrant corresponds to ¼ of that distance, or 1/120 inch. As seen in FIG. 3B, the analog to digital conversion circuitry is somewhat different as compared to the rotary motor. Here, the sensors are placed such that the differentials of their outputs change at the position boundaries. In other words, in amplifier 43 of FIG. 3B, a difference between the M and D signals is obtained, whereas in amplifier 44 the M and D signals are added together and compared with a reference voltage, such that a sum signal is obtained. Note that the plus input to amplifier 44 has a reference signal connected to it which is derived from a plus 5 V source and the voltage divider comprised of resistors 46, 47. This provides approximately a 2.5 volt reference, which represents the base line of the sensor signal. The 2 bit code which is derived at the outputs of amplifiers 43, 44 is depicted in FIG. 3A. Note that, as with the rotary case, the 2 bit code changes only 1 bit at a time from quadrant to quadrant.

There have thus been illustrated two alternate ways of deriving a 2 bit digital signal for use with the control system of this invention. In both cases the signal is cyclical in the sense that it goes through 4 quadrants, or states and then repeats itself. In each case as the motor proceeds in either direction, from one sensor quadrant to the next there is only a single change of state, i.e. only 1 bit of the 2 bit signal changes. This feature is utilized to detect errors in the manner as described more fully in connection with FIG. 4 as follows.

Figure 4:
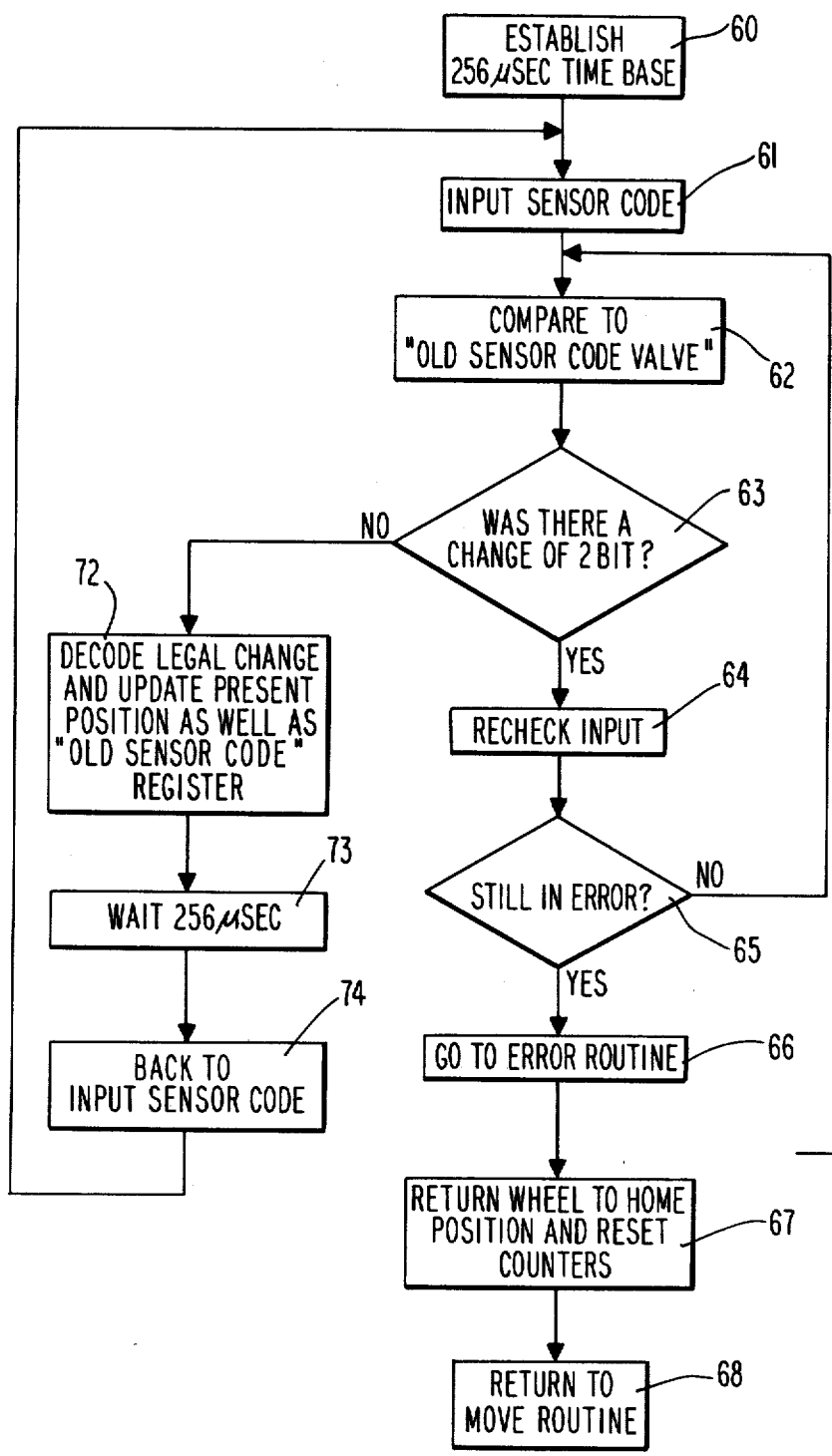
FIG. 4 is a flow chart for the error detection logic utilized in this invention.

FIG. 4 comprises a block diagram of a software embodiment utilized in implementation of this invention. In this embodiment, an F8 microprocessor may be utilized, which is a commercially available chip form microprocessor. It is to be understood that whether such a chip form of logic circuitry is utilized, or more conventional IC circuitry for performing the logic, such as illustrated in FIG. 5, this portion is part of the overall control system.

Referring to the detail of FIG. 4, at block 60 a 256 microsecond time base is generated, i.e. every 256 microseconds the error detection routine is run. As shown in block 61, the 2 bit sensor code is inputted and then, as block 62, compared to the old sensor code value which has been stored in a register. For example, and assuming CCW rotation, if the new sensor code is the second quadrant of position 1, the binary code 10 is compared to the old value of 11. At block 63, there is a determination as to whether there is a change of 2 bits. If the answer is no, e.g. only 1 bit has changed, then the program exits to block 72. If the answer is yes, indicating an error, the input is rechecked at block 64. If the input is no longer in error, the routine exits at B and goes back to again make the comparison at block 62. Presuming that the error is still sensed when the routine reaches block 65, that routine goes to the error routine at block 66. This comprises a return of the wheel to the home position and resetting of the counters to a reference value, as shown in block 67, followed by a return to the move routine at 68. As seen in connection with FIG. 6, the move routine controls movement of the motor, and thus of the rotary wheel, to the desired target position.

Assuming that the detected change was a proper one state change, i.e. a "legal" change, the function of block 72 is next carried out. The legal change is decoded and used to update the present position which is maintained in a storage register, if there has been a change of present position. In addition, the sensed code is stored in the "old sensor code" register, so that it is available for the next comparison. After 256 microseconds as seen in block 73, the routine is run again, starting at A.

Figure 5:
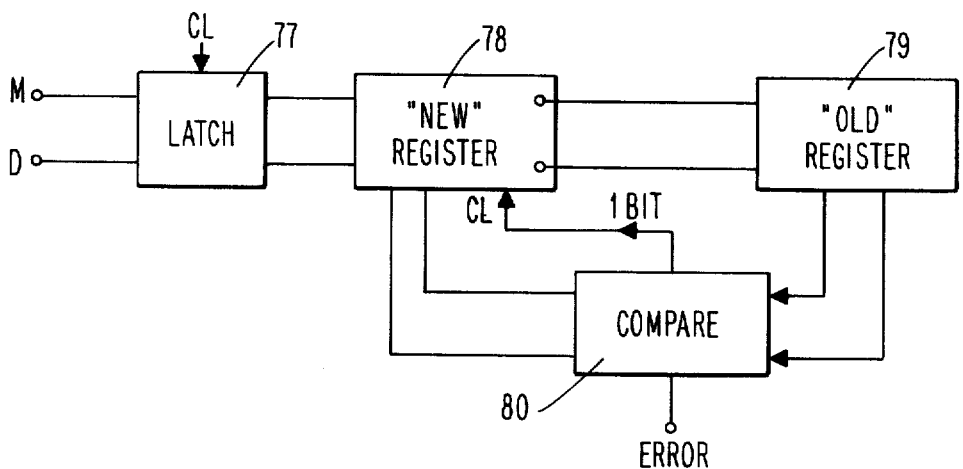
FIG. 5 is a block diagram of error detection logic circuitry for an alternate embodiment of this invention.

In FIG. 5 there is illustrated an alternate means of making the comparison to determine whether the sensor code is in error, using more conventional logic circuitry. The M and D signals are clocked through a latch 77 to a new register 78. The output of new register 78 is compared with the contents of old register 79 (which holds the prior sensor code) in compare circuit 80. If the comparison is not simply 1, an error signal is produced. If a comparison is a single 1, i.e., only 1 bit has changed, an output is connected to a clock or shift terminal of register 78 to transmit the newly sensed information to old register 79.

It is noted that specific means of recalibration, while not detailed in this specification, is necessary to integral operation of the system. The means of calibration may be accomplished in a number of well known ways.

Figure 6A:
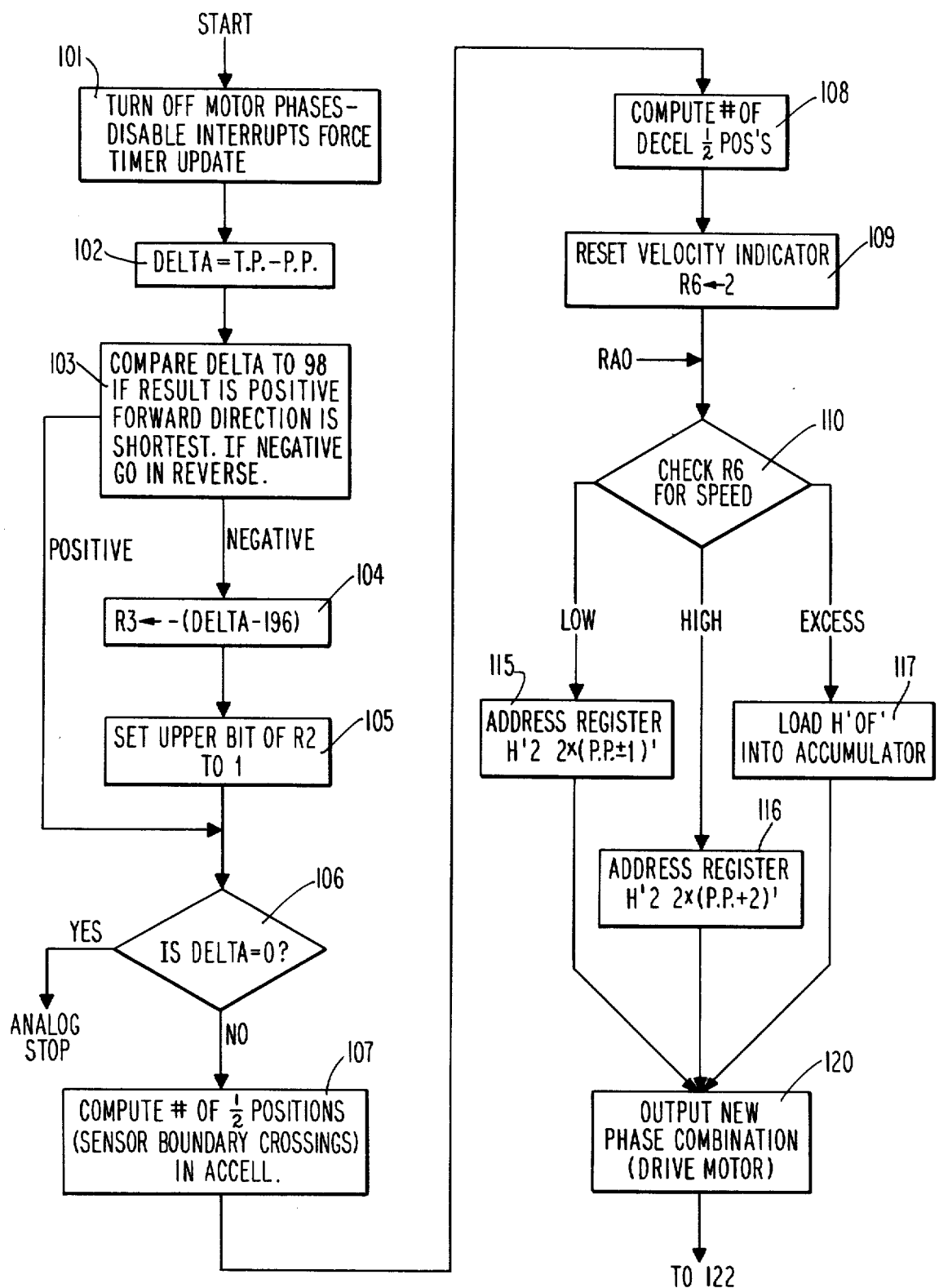
FIGS. 6A and 6B make up a flow chart of the drive control for controlling the motor drive for the system of this invention.
Figure 6B:
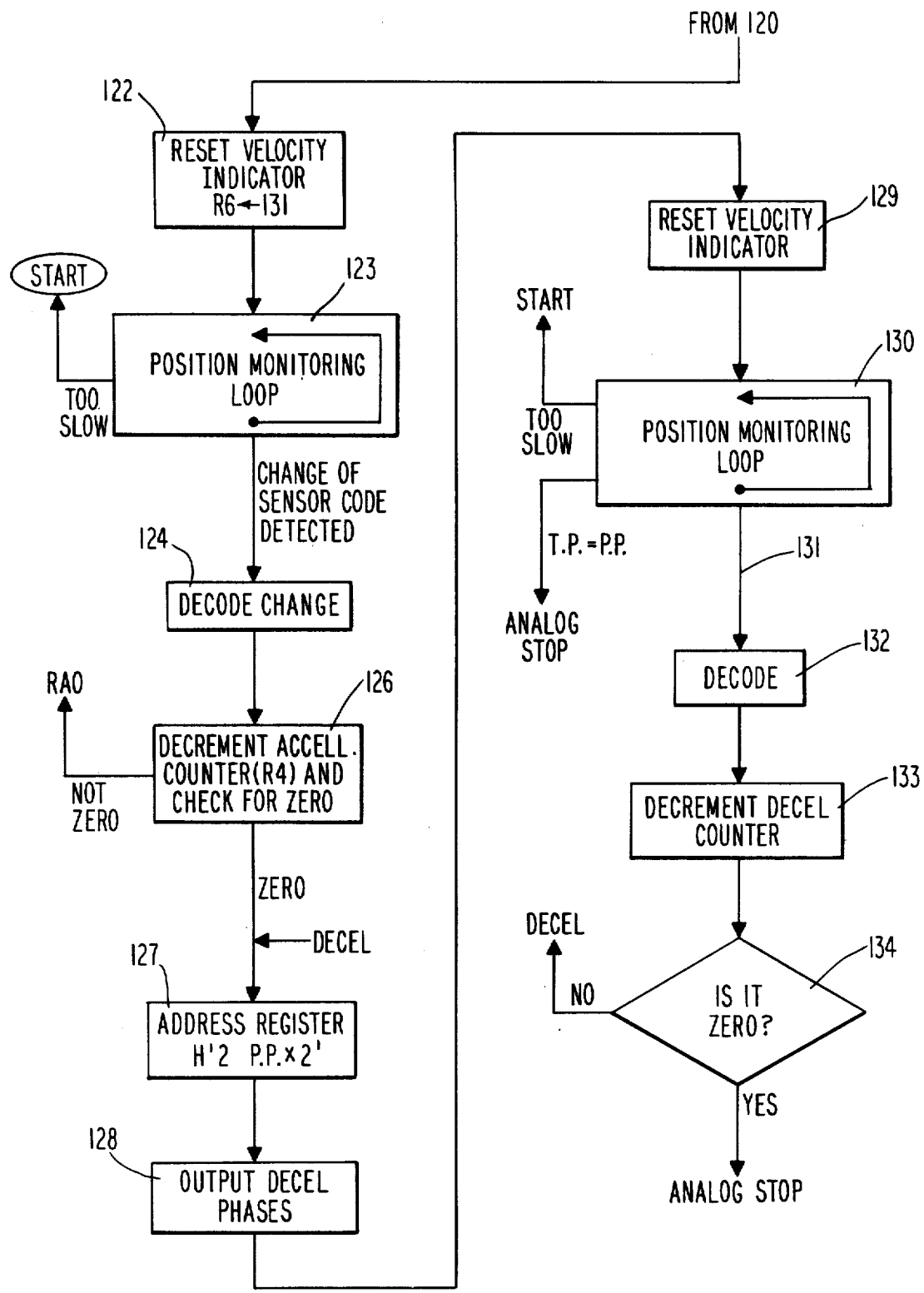

Referring now to FIG. 6, there is shown a flow diagram of a routine suitable for use in controlling the motor in accordance with this invention. While the diagram illustrates control of a rotary motor, it can be adapted for control of a linear motor with minor modifications that are obvious to one of skill in the art. While the use of a microprocessor routine is shown as a preferred embodiment, it is to be understood that other techniques and hardware may likewise be used in an equivalent manner. The important feature of the control is the utilization of the position information, which has been error detected, for position to position control of the motor.

The routine, referred to as the MOVE routine, is started at block 101, with certain bookkeeping functions. As this point, a legal command has been acepted and the target position has been loaded into a register (R1). This number will be an even decimal number between 0 and 194 inclusive. Note that there are 196 positions on the wheel numbered from 0 to 195, and there are 98 actual pedals. The present position information has been updated by the action of the routine illustrated in FIG. 4. At block 102, delta is calculated, being the difference between the target position and the present position. At block 103, delta is compared to 98, for the purpose of determining whether the motor should go in a CCW direction or a CW direction. If the result is positive, the motor is rotated in a CCW direction, this being the shortest direction to get to the target position. Conversely, if delta when compared to 98 is negative, the motor is rotated in a CW direction. For the negative situation, at block 104 the factor—(delta $-196$) is the reverse trip length. At 105, the upper bit of a register R2 is set to 1, indicating that the reverse direction is to be followed. The bit chosen is of course arbitrary, and for this routine a 1 designates clockwise and a 0 designates counter clockwise.

At block 106, a determination is made as to whether delta is 0. If yes, this indicates that the motor is at the target position, and the routine exits to provide an analog stop signal. If no, this means that the target position has not yet been obtained, and the routine proceeds to block 107. At block 107, the number of half positions corresponding to sensor boundary crossings for the "accel" portion of the routine is calculated. The routine causes the motor to accelerate for roughtly half of the sensor quadrants, or half positions, and decelerate (decel) for the second half, bringing the motor and thus the wheel (or slider in the linear case) to the desired target location. The number of accel half positions is determined as follows:

If delta is greater than 0 but equal to or less than 13, the number of accel half positions is equal to delta;

If delta is greater than 13 but equal to or less than 19, the number of half positions is (delta$-13$)/4$+$delta; if delta is greater than 19 but less than or equal to 98, the number of half positions is 3 (delta$-19$)/4$+$(delta$-13$)/4$+$delta.

For these formulations, division by 4 is always rounded down to a whole number. If the present half position is adjacent to the next position boundary to be crossed 1 is substracted from the number of accel half position. If delta equal 1 and 1 is subtracted, then the number of accel half positions is set back to 1.

After determination of the number of accel half positions in block 107, the number of the decel half positions is computed at block 108. The number of decel half positions is made to be equal to 2$\times$delta—the number of accel half positions. Thus, the number of accel half positions plus the number of decel half positions equals the total number of half positions between the present position and the target position.

At block 109, the velocity indicator is reset. As illustrated, a register (R6) is set to the value of 2. The velocity indicator contains, at R6, a count which normally counts down from 131. The count is decremented by the number of times the position monitoring loop is worked, as described hereinbelow in connection with block 123. The number of position monitoring loops that it takes until a sensor boundary is crossed gives an indication of the actual velocity of the rotary or linear motor. Setting register R6 equal to 2 initially gives a slow speed indication for start up; after the first step this reset velocity register accurately indicates the actual speed of the motor.

Proceeding to block 110, the accel portion of the routine is entered. At block 110 a determination is made as to which of 3 speed modes the motor should move in, i.e. excess, high, or low. In excess, the motor coasts, which is the condition when the motor is at the high speed limit. The motor is always run at maximum torque, except when coasting. The mode is chosen by examining the velocity indicator. By way of example, if the position monitoring loop of block 123 is cycled 3 times of less, the excess mode is chosen; if it is cycled 4 or more times up to 19 or less times, the high mode is chosen; if it is cycled 20 or more times but less than 131 times, the low mode is chosen.

Referring now to blocks 115, 116 and 117, the routine makes the determination of what phase combination is to be selected to drive the motor. Reference is made to Table I, which shows the associated phases which are selected and driven corresponding to Hex address registers H'20' through H'27'. As used in the formulas to blocks 115, 116, "pp" means present position and represents the least significant 3 bits of the conversion of the decimal present position. When P.P. is operated upon, the 3 least significant bits of the result are utilized to determine the second digit of the address register. By way of example, referring to FIG. 2A, when the present position is 195, and 3 least significant bits are 011. When this is multiplied by 2, it becomes 110. If 1 is added, the digit is 7; if 2 is added, the digit is 1.

TABLE I

| Phase Table | |
|---|---|
| Address | Associated Phases |
| H '20' | 1 & 2 |
| 21 | 1 & 2 |
| 22 | 2 & 3 |
| 23 | 2 & 3 |
| 24 | 3 & 4 |
| 25 | 3 & 4 |
| 26 | 4 & 1 |
| 27 | 4 & 1 |

For the low mode, the address register is chosen by selecting the second address digit according to the formula $2\times(PP\pm 1)$ where the plus or minus decision is based upon the direction of movement. For the high mode, the second digit of the register is calculated according to the formula $2\times(PP+2)$. In other words, if the chosen register is 22, associated phases 2 and 3 are driven; if the calculation is such that the second digit is 5, then register 25 is shown, and phases 3 and 4 are driven. In the excess mode, the motor is turned off and allowed to coast. Thus, from position to position a register is chosen which determines which phases are driven, a single phase pair being driven for each position. The output signal to chose the corresponding phase pair is outputted at block 120 to drive the motor.

At block 122, the velocity indicator is reset to 131, and at block 123 the position monitoring loop is cycled. The sensor code is checked once every pass through the position monitoring loop. The register is decremented 1 count for every pass, and when a sensor code boundary crossing is detected the loop is exited and the change in position is decoded. If the register R6 is counted down to 0 before a change is detected, this means the motor is moving too slow and control is passed back to start.

At decode block 124, the following determinations are made:

Has a position boundary been crossed? If no, the old sensor code register is updated, the legality of the sensor code change is checked, and the accel counter register is decremented. If the accel counter register is not 0, the routine goes back to RAO and continues the accel control. If a position boundary has been crossed, a determination is made as to whether the change of the sensor code was legal. If not, the same determinations are made as discussed in connection with FIG. 4. If yes, a determination is made as to whether the rotation is clockwise or counter clockwise. The present position counter is incremented or decremented according to direction of rotation. Also, the discontinuity which occurs at positions 195 and 0 must be checked for.

When the accel counter R4 has been decremented to 0, as shown in block 126, the motor is ready for decel and enters this portion of the control routine at block 127. Here there is just one speed mode, and it is addressed by formulating the second address digit as $PP\times 2$, as seen in block 127. The phase pair chosen according to the phase table of Table I is outputted at block 128, to drive the motor. At block 129 the velocity indicator is reset as for the accel portion, and at block 130 the position monitoring loop is entered to determine velocity. If the target position is equal to the present position, the routine exits to analog stop, stopping motor movement. If the velocity is determined to be too slow, i.e. the number of loops counted to have been decremented exceeds a predetermined number, the routine goes back to start. If the routine proceeds, a change in sensor code is detected at decode block 133, and the decel counter is decremented at 133 as before. The number of decel half positions is counted, and when this counter is down to 0 the loop is broken and an analog stop signal is generated, indicating that the wheel has come to the indicated target position.

There has been illustrated a preferred embodiment of the motor drive system of this invention. The means of driving the print wheel, or other element, is a part of a hardware system for a typewriter or the like, and as such equivalent embodiments may be engineered within the scope of this invention. Such equivalent embodiment may utilize differing degrees of hardware and software components. However, it is important that accurate position information be obtained in the manner described herein. Also, while variations in the manner and order of choosing phase pairs which are energized are within the scope of the invention, it is important that the selection of the phase pair to be energized is done as a function of the tracked position of the element, i.e., the print wheel or carriage. By tracking, or continuously determining the position of the movable element on a step-by-step basis, accurate position information is obtained from which a more optimum and reliable determination of phase pair energization is made.

I claim:

1. A stepper motor system with improved tracking means, comprising:

a stepper motor and an element coupled to and driven by said stepper motor; sensor means for generating a plural state sensor signal representative of movement of said element through a plurality of positions, said signal normally being cyclical with said movement and changing a predetermined number of states at a time;

means continuously operable as said sensor signal goes through a plurality of cycles for determining when other than said predetermined number of states of said signal change at a time, whereby the sensor signal is continuously detected to be legal or in error as said stepper motor drives said element through a controlled number of positions.

2. The system as described in claim 1, wherein said signal is a 2 bit signal, and only 1 bit of said signal changes at a time.

3. The system as described in claim 2, wherein said sensor signal cycles through four state changes corresponding to two motor steps.

4. The system as described in claim 1, wherein said element is a carriage of a typewriter which is moved linearly.

5. The system as described in claim 1, wherein said element is a print wheel which is rotated.

6. The system as described in claim 1, wherein said sensor means comprises two sensors which each develop a sensor signal, said two sensors being mounted relative to said element so as to develop signals 90° out of phase.

7. The system as described in claim 1, wherein said signal is a two bit signal, and said determining means determines when both of said bits change, whereby an error is detected.

8. The system as described in claim 7, comprising means for tracking the position of said element, and further comprising means for resetting said tracking means when an error is detected.

9. Linear drive apparatus for use in a typewriter and the like, comprising:
   a. A linear stepper motor having a linearly driven slider element;
   b. Carriage means for carrying a printing mechanism, said carriage means mounted on said slider elment;
   c. Means for driving said stepper motor sequentially one step at a time;
   d. Sensor means connected to said carriage or said slider for generating two sensor signals 90° out of phase, said sensor signals being periodic as said carriage moves and having a predetermined relationship to said motor steps;
   e. Means for converting said sensor signals to a 2 bit signal having a sequence such that normally only 1 of said 2 bits changes at a time and said signal repeats itself with each cycle of said sensor signals; and
   f. Means for periodically comparing each bit of said 2 bit signal with the corresponding prior bit and determining if other than 1 of said 2 bits has changed.

10. The drive apparatus as described in claim 9, wherein said linear stepper motor is a four phase motor and comprising means for energizing two of said motor phases at a time for each motor step.

11. Rotary drive apparatus for a typewriter or the like, comprising:
   a. a rotary stepper motor;
   b. a print wheel, connected to be driven by said rotary stepper motor;
   c. means for driving said rotary motor sequentially a predetermined portion of a revolution at a time;
   d. sensor means operatively mounted relative to said print wheel for generating two sensor signals 90° out of phase, said sensor signals being periodic as said print wheel rotates and having a predetermined relationship to print wheel rotation;
   e. means for converting said sensor signals to a cyclically changing 2 bit signal having a sequence such that normally only 1 of said 2 bits changes at a time, and comparison means for comparing each bit of each changed 2 bit signal with the corresponding bit of the prior 2 bit signal and determining if other than 1 bit of said 2 bit signal has changed.

12. The drive apparatus as described in claim 11, wherein said rotary stepper motor is a four phase motor and comprising means for energizing two of said phases at a time for each motor step.

13. In a typewriter device having a stepper motor for driving an element, and having sensor means for generating sensor signals carrying information concerning the position of said element, the improvement characterized by analog to digital means for converting said sensor signals to a plural bit digital signal, said digital signal changing periodically as said element is moved in a manner such that normally only one of said plural bits changes at a time, means for storing the just prior digital signal, means for comparing each bit of a new digital signal with the corresponding bit of the stored just prior signal and determining whether more than 1 bit of the plural bits of said signal has changed, and means for generating an error signal when said comparison is not valid.

14. The system as described in claim 13, comprising means for tracking the position through which said element has been driven, said tracking means comprising means for counting changes of said plural bit signal.

15. The system as described in claim 14, comprising means for resetting said tracking means when an error signal has been generated.

16. The system as described in claim 13, wherein said comparison means comprises means for making said comparison for each new value of said plural bit signal.

17. The system as described in claim 13, comprising means for making said comparison on a periodic time basis.

18. A device having at least one element adapted to be moved through a plurality of positions, a controllable motor operatively connected to said element for moving said element to a selected position, said motor having a plurality of windings and energizing means for selectively energizing windings of said motor, characterized by said energizing means comprising tracking means for tracking the position of said element, said tracking means comprising means for generating a cyclically changing plural bit sensor signal which provides information concerning position changes of said element, means for comparing each bit of said sensor signal with the corresponding bit of the prior sensor signal and correcting said sensor signal as a function of said comparing, and means for selecting and energizing said windings as a function of the position of said element.

19. The device as described in claim 18, having a plurality of said elements and a motor operatively connected to a respective one of each of said elements, and energizing means for selectively energizing windings of each respective one of said motors as a function of position of said respective element.

20. The device as described in claim 18, wherein said sensor signal is a 2 bit signal.

21. The device as described in claim 18, comprising direction means for determining the direction of said element from said sensor signal.

22. The device as described in claim 21, wherein said direction means comprises means for making an exclusive or logical analysis of said sensor signal.

* * * * *